United States Patent
Gopinath et al.

(10) Patent No.: US 8,892,649 B2
(45) Date of Patent: Nov. 18, 2014

(54) MANAGEMENT OF USER PROFILES IN A CLOUD BASED MANAGED UTILITY COMPUTING ENVIRONMENT

(75) Inventors: Vinod Kumar Gopinath, Chennai (IN); Ripan Sarkar, Chennai (IN); Suresh Kasamuthu, Chennai (IN)

(73) Assignee: Novatium Solutions Pvt. Ltd., Chennai (IN)

( * ) Notice: Subject to any disclaimer, the term of this patent is extended or adjusted under 35 U.S.C. 154(b) by 0 days.

(21) Appl. No.: 13/513,407

(22) PCT Filed: Nov. 30, 2010

(86) PCT No.: PCT/IN2010/000772
§ 371 (c)(1),
(2), (4) Date: Jun. 1, 2012

(87) PCT Pub. No.: WO2011/067781
PCT Pub. Date: Jun. 9, 2011

(65) Prior Publication Data
US 2012/0239752 A1    Sep. 20, 2012

(30) Foreign Application Priority Data
Dec. 2, 2009   (IN) ............................ 2969/CHE/2009

(51) Int. Cl.
*G06F 15/16*    (2006.01)
*G06Q 30/02*    (2012.01)

(52) U.S. Cl.
CPC ..................................... *G06Q 30/02* (2013.01)
USPC ........................................... 709/204; 709/223

(58) Field of Classification Search
USPC .................................. 709/204, 223, 224, 200
See application file for complete search history.

(56) References Cited

U.S. PATENT DOCUMENTS

2004/0128583 A1* 7/2004 Iulo et al. ........................ 714/25
2008/0103971 A1* 5/2008 Lukose et al. .................. 705/40

* cited by examiner

*Primary Examiner* — El Hadji Sall
(74) *Attorney, Agent, or Firm* — Symbus Law Group, LLC; Clifford D. Hyra

(57) ABSTRACT

A system and method of managing the profiles of users in a cloud based managed utility computing environment. New architectures and components are required for the delivery, management and control of a user's profile in a managed utility computing environment that works over the Internet (referred to in the title as the cloud). A user profile is built where the user can receive information of interest in a cloud-based managed utility computing environment. The profile stores the characteristics and interests of the users and this can be used to the benefit of the user and also the service provider. Applications and advertisements are provided to appropriate users.

12 Claims, 1 Drawing Sheet

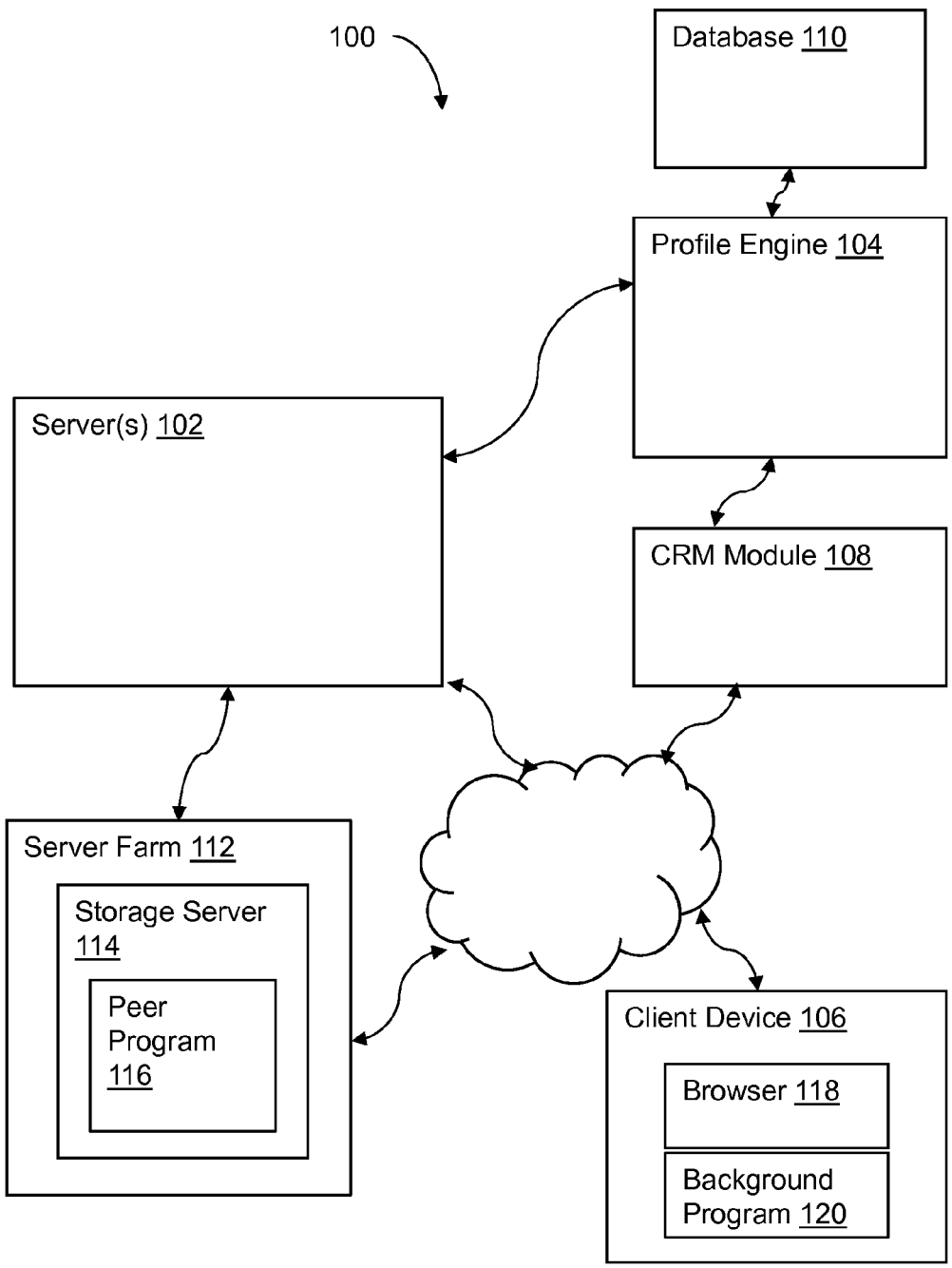

MANAGEMENT OF USER PROFILES IN A CLOUD BASED MANAGED UTILITY COMPUTING ENVIRONMENT

This application claims the benefit of Indian patent application No. 2969/CHE/2009, filed Dec. 2, 2009, which is hereby incorporated by reference in its entirety.

FIELD OF INVENTION

The present invention relates to a system and method of managing the profile of users in a cloud based managed utility computing environment. Specifically, the present invention deals primarily with architectures and components required for the delivery, management and control of users' profile in a managed utility computing environment that works over the Internet (referred in the title as cloud). More specifically, the present invention deals with the building of the user profile where the user can receive information of interest in a cloud based managed utility computing environment. Further the present invention elucidates how the profile stores the characteristics and interests of the users and how this can be used to the benefit of the user and also the service provider. Moreover, the present invention relates to providing applications and advertisements to appropriate users.

DESCRIPTION OF THE PRIOR ART

There have been a number of attempts at utility computing and cloud computing but all these face from the problem that they are not end to end. Most of the solutions are dependent on a personal computer (PC) as the client end device. The PC itself is a very capable device that can run a number of different applications. Most of the utility computing and cloud computing solutions do not have the control and management ability of all these applications. Typically existing utility and cloud computing solutions are based on one or few applications and only have control of these applications. They do not manage everything that happens on the PC and hence cannot provide the user with a complete experience. For example, the user would like to use image manipulation software for a month. For this requirement there is no easy to use and integrated utility computing solution. The user has to search for the application and find with difficulty and bookmark this site for future usage. There is no utility computing solution that can take care of this solution dynamically. Most of the solutions would require a pre-bundling of the software on the client or would involve huge download across the network and so can be achieved only on local area networks (LAN). These are not extensible over wide area networks (WAN).

On the other hand cloud computing itself is hindered by multiple problems. The major attraction of cloud computing is the access that users have to different types of applications over the web. Most of these applications run on the browser. The user searches for a particular type of application or usually is informed of an interesting application by friend or one of the news websites. If the user finds it interesting, he/she starts using it. The problem with this system is that the user has to search and reach out for things The system does not reach to him/her; it does not come back to him/her and inform of a new application or content of potential interest to user that is available on the cloud. The other problem is that a complete computing system that is suggestive and guides the user to interesting applications and content is not available for the user. So the user spends a lot of time being unaware of applications and content that interests him/her. Also, if the user needs some application or content, it is up to him/her to find it through the search sites.

Problems of the Prior Art

1. The utility computing and cloud computing services cannot guarantee desired service for the user as it cannot manage user's device and hence is not aware of his/her interests and activities.
2. The current solutions cannot reach out to the customers. The customer has to go searching for the existing utility and cloud computing solutions either with up ahead information or blindly. The customer cannot be made aware of products proactively based on his/her interests.
3. Content and application providers do not have an opportunity to reach directly to customers who are interested in their product as they have no concrete idea of customer's interests. Also, reaching them is limited to the time that the customer is on the browser or such Internet access application.
4. The user has to put in a lot of effort to build a solution that can cater to all his/her computing needs. Even then it is a compromise of bookmarks on a browser. But there is no solution where he/she is suggested applications and content based on interest and the application/content addition happens with just a click of mouse or two.
5. From the different application and content providers and advertisers point of view there is very little chance of reaching out their content to high relevance users. In order to reach such audience, using the currently available schemes invasive technology is required that could compromise the user's privacy. So the content and advertisements are thrown at general audience without an idea has to whether anyone would pick up the content.

Some attempts have been made in the past to deal with overcoming the said limitations of the prior art as given below.

U.S. Pat. No. 5,694,595 titled "Remote user profile management administration in a computer network" talks about user profile that is required for a distributed computer system. It is a system administration profile used in a distributed computing environment. The present invention states about a user profile from a utility computing system point of view. Moreover, it talks about the use of applications by the users to build user's interests, which, are used in suggesting new applications and content that the user would like.

U.S. Pat. No. 6,519,571 titled "Dynamic customer profile management" states about forming a user profile based on the user purchase and other such user purchasing pattern. It is limited to a purchasing pattern and does not deal with the profile of a user from the personal information and usage in a managed cloud computing environment.

US2004186901 titled "A system for managing user profile data" deals about the management of user profile in communication environment. The user profile is related to communication network data and not the profile as in the user's interests and characteristics, which is used to decide the types of advertisement, information, applications and content the user would be interested in as that of the present invention.

US20060080592 titled "System for management of interactions between users and software applications in a web environment" deals with the management interaction between a user and applications. It does not deal with the building of the user profile so that the user can receive information of interest in a cloud based managed utility computing environment as that of the present invention.

WO2008059535 titled "Utility computing dynamic features management" talks about how to manage the users and other entities in a utility computing environment. In the present invention, the user's management is enhanced by user profile management to deliver content and applications of choice in the managed utility computing environment.

WO2010035281 titled "Providing utility computing in a cloud computing environment" talks about how an end to end managed utility computing system can be setup and moreover it describes the components. In the present invention, the user's management is enhanced by user profile management to deliver content and applications of choice in the managed utility computing environment.

The present invention avoids the problems/disadvantages noted above and overcome other problems encountered in conventional methods and provides an end/to end utility computing environment on Internet that is aware of user's interest and characteristics. The present invention interacts with the user to learn his/her interests and desired activities. Moreover, it also guides the user to newer applications and content in his/her areas of interest. Further it enables the user to specialize in his area of interest. In addition, it also aids the service providers and advertisers to target their content to the right audience.

OBJECTS OF THE INVENTION

The problems of the prior arts can be solved in the current innovation through a combination of a managed user end device and the management of the users' interests, which are managed by a set of servers. The primary object of the present invention is directed to provide a system and method of managing the profile and interest of users in a cloud based managed utility computing environment.

It is another object of the present invention to provide a system and method of managing the profile of users, wherein the management of the users and user interests are managed by a set of servers.

It is another object of the present invention to provide a system and method of managing the profile of users, wherein the architectures and the components required for the delivery, management and control of users' profile in a managed utility computing environment works over the Internet (referred in the title as cloud).

It is yet another object of the present invention to provide a system and method of managing the profile of users, wherein the client side thin device used is completely managed through the Internet.

It is another object of the present invention, wherein the client side device has built in self healing features as a result of which the user gets guaranteed 24×7 computing.

It is another object of the present invention, wherein the self healing is achieved by determining the condition of applications and data and synchronizing with a server across the Internet to rectify any issue and the said servers are used to manage the devices.

It is another object of the present invention, wherein the profiles are based on user entered information (personal) and user computer usage patterns.

It is another object of the present invention, wherein the management of users' profile occurs at two levels viz., at the device level and user level.

It is another object of the present invention, wherein the profile are exchanged in the XML format but can be stored on the server in any database form (relational, XML, etc).

It is another object of the present invention, wherein the profiles are created through a combination of periodic and dynamic information capture.

It is another object of the present invention, wherein the user profile and device profile are driven by the above mentioned inputs.

It is another object of the present invention, wherein the user profile consists of two parts, viz. characteristics and interest.

It is another object of the present invention to provide a system and method of managing the profile of users, wherein the information provided can be close to 100% accuracy.

It is another object of the present invention, wherein the system comprises a user interface through which the user can receive a number of application icon, Internet based information and content on the desktop itself.

It is another object of the present invention to provide a system and method of managing the profile of users, wherein the utility computing environment acts a middleware to provide applications and content from different application and content providers hosted on the Internet and on the utility computing servers.

It is another object of the present invention, wherein the middleware deals with the addition of these content and applications to the environment, its automatic deployment and tracking and billing of the product.

It is another object of the present invention, wherein the user could from time to time change the profile by removing or adding other customizations and personalization, the said data are updated to his/her utility computing profile and referred as the periodic profile change.

It is another object of the present invention, wherein the user interests is honed by learning from his/her computing service usage pattern.

It is another object of the present invention, wherein the usage data of the users is collected and managed by the utility computing service management system (UCSMS).

It is another object of the present invention, wherein the data is sent in batches to the Profile Engine (PE), which analyses the data and summarizes it to form the dynamic interests of the user.

It is another object of the present invention, wherein additional profile parameters can be added dynamically at a later point of time.

It is another object of the present invention, wherein the use of profile in providing applications, content and services, referred from here as product services, to the most relevant customers.

It is another object of the present invention, wherein a mechanism is provided to automatically register product services to the utility computing system and to display the appropriate product services in the users shopping cart in his/her customer service portal.

Another object of the present invention is to optimize last mile bandwidth utilization and internet cost to users while downloading data/content from the web.

It is another object of the present invention to provide a system and method of managing the profile of users, wherein a facility is provided by which the web content gets directly downloaded from the web server to the server farm, without going to the end device.

SUMMARY OF THE INVENTION

Thus according to the basic aspect of the present invention there is provided a utility computing management system (UCMS) for managing the profile and interest of users in a cloud based managed utility computing environment comprising:
  one or more servers;
  client side device;
  self healing means;
  profile engine (PE);
  CRM module; and
  user interface,
  wherein the client side device is completely managed through the Internet,
  wherein the self healing means is achieved by determining the condition of applications and data at the client side device and synchronizing with a server across the Internet to rectify any issue,
  wherein the management occurs at device level and user level,
  wherein the profile is the essential information that is transmitted between the client and the server and includes both device profile and user profile,
  wherein the user profile and the device profile are driven by the dynamic information capture and the periodic information capture,
  wherein the utility computing environment acts as a middleware to provide applications and content,
  wherein the usage data of the user is collected, managed and sent by the UCMS and the basic user data is collected and sent by CRM modules respectively in batches to the PE,
  wherein the PE analyses the data received from the UCMS and CRM modules and summarizes the same to form the dynamic interests and characteristics of the user respectively which is stored in an associated database, and
  wherein through the user interface, the user can receive on its desktop applications, information and contents.

It is another aspect of the present invention, wherein the dynamic information capture is the information that emerges out of users' usage of the client device and based on said information, the user is provided with related applications and contents.

It is another aspect of the present invention, wherein the periodic information capture is based on the user confirmation of interests in the new area and application.

It is another aspect of the present invention, wherein the user can from time to time change the profile.

It is another aspect of the present invention, wherein the associated database stores the current user interest, characteristics of the user and the pattern of usage based on time.

In accordance with another aspect of the present invention there is provided a method of creating and managing the profile and interest of users in a cloud based managed utility computing environment using the said system, comprising:
  registering of users to the utility computing environment;
  creating profiles through a combination of periodic and dynamic information capture;
  providing applications and content from different application and content providers;
  recording new information into the user profile; and
  making the applications and websites available to the user and based on user profile and device profile,
  wherein the profiles are based on user entered information and device usage patterns,
  wherein the user receives on its desktop applications, information and contents through the user interface,
  wherein the user during registration also designs the desktop by giving user areas of interest,
  wherein the user can from time to time change the profile, and
  wherein the management of the users and user interests are managed by a set of servers.

It is another aspect of the present invention, wherein the user profile is used to provide user with application, information and content.

In accordance with another aspect of the present invention there is provided a method of gathering and utilizing the data of the user by the utility computing service management system (UCSMS), using CRM module and Profile Engine (PE) comprising:
  collecting the usage data of the users and device;
  sending the usage data of the users in batches to the Profile Engine (PE);
  analyzing and summarizing the data to form the dynamic interests of the user;
  storing the data in an associated database by the PE;
  categorizing the user based on the data; and
  using the data to provide user with application, information and content,
  wherein the database stores the current interests, characteristics of the user and the pattern of usage of the user, and
  wherein the information is categorized and sub-categorized based on the combination of interests and characteristics.

In accordance with another aspect of the present invention there is provided a method of determining the number of users who are online by Profile Engine (PE) based on the said categorization comprising:
  updating during the non-peak hours the changes that happen in the user's characteristics and interests; and
  determining the number of users from the set who are online,
  wherein the changes include new users and deleted users who have unsubscribed to the utility computing service.

It is another aspect of the present invention, wherein the data on the number of users online, their characteristics and interests are used to direct advertisement, targeted information, applications and contents.

It is another aspect of the present invention, wherein the web contents are stored/downloaded from the web server to the server farm, without going to the end device thereby optimizing last mile bandwidth utilization and internet cost,
  wherein the web request from the device's browser to the web server is stopped using a background program in the device,
  wherein the relevant parameters of the downloaded request like source URL (Uniform resource locator) and the actual destination directory (user's home directory) are communicated to a peer program running in the storage server through a reliable control connection,
  wherein a request is initiated to the actual web server to download the content,
  wherein the content is sent back directly to the storage server in the server farm by the web server, and
  wherein the downloaded content is stored in the user's home directory present in the storage server in the server farm.

In accordance with another aspect of the present invention there is provided a method, wherein new applications and/or contents are added as a service to the Utility Computing System through an automated work flow process comprising:
  means to load data relating to applications and/or contents through a web based interface that connects to the Utility Computing Management System (UCMS);
  storing the data in a service database;
  sending a trigger on the availability of the data for testing;

testing the service and either approving or rejecting the service;

sending the approved service for further finance, marketing and sales approval;

assigning the cost to the approved product service; and positioning the service in the deployment and offering database and making available the applications and/or contents to users for purchase, wherein making available the applications and/or contents is based on the characteristics and interest of the user in the user's portal, and wherein the purchase is tracked to split the revenues between the product developer and the service provider.

The objects, advantages and novel features of the invention may be realized and obtained by means of the instrumentalities and combinations particularly pointed out in the detailed description.

BRIEF DESCRIPTION OF THE DRAWINGS

FIG. 1 diagrammatically illustrates a utility computing management system according to the present invention, in an embodiment.

DETAILED DESCRIPTION OF THE INVENTION

The present invention as discussed hereinbefore relates to a system and method of managing the profile and interest of users in a cloud based managed utility computing environment. Specifically, the present invention deals primarily with architectures and components required for the delivery, management and control of users' profile in a managed utility computing environment that works over the Internet (referred in the title as cloud).

The management of the users and user interests are managed by a set of servers. At the user end of this environment is a thin device that is completely managed through the Internet. The devices have built in self healing features as a result of which user gets guaranteed 24×7 computing. The self healing is achieved by determining the condition of applications and data at the client end and synchronizing with a server across the Internet to rectify any issue. These servers are used to manage the devices.

According to the present invention, the management occurs at two levels viz., at the device level and user level. The essential information that is passed between the client and the server in this regard is called Profile. The profiles are based on user entered information (personal) and user computer usage patterns. The device profile defines the characteristics of the device and the user profile defines the user interests and characteristics. Both these profile are exchanged in the XML format but could be stored on the server in any database form (relational, XML, etc). Both these profiles are created through a combination of periodic and dynamic information capture. The dynamic information capture refers to the information on users interests that emerges out of his/her usage of the computing system. Based on this information the user is guided to related applications and content on the Internet and the utility servers. When the user confirms his/her interests in the new area and application this information is recorded onto his/her profile. This is the periodic information capture. The user and device profile are driven by the above mentioned inputs.

In another aspect of the present invention, the user profile consists of two parts, viz. characteristics and interest. Characteristics are the details about the user that are captured from them. For example, age, sex, area of residence, occupation, salary range, etc. Depending on the type of information there is an accuracy value that is attached with the characteristic. For example, in a utility computing service the area of residence of the user is known with almost 100% accuracy (as in the broadband service providing). On the other hand the information regarding the salary range of the user might only have 20 or 30% accuracy as the user might choose not to provide it or might provide arbitrary data.

The characteristic of the user are collected during the registration of users to the utility computing environment. The user register the device and his/her credentials on the first usage of the utility computing system. At this point of time, some of the user characteristics could be captured—for example age, occupation, etc. These characteristics are not validated and the values are left to user discretion and so initially, the accuracy values are low. The accuracy of these characteristics could increase through further interactions between the utility service provider and the users. Through this process the characteristic accuracies could move up to 100%. Other information like name, address, etc., is captured earlier as soon as the user has confirmed for the utility computing service and is often validated by the provider. These characteristics have an accuracy of nearly 100%.

Also the interest of the users deals with their personal choice of application and content. It tracks the kind of activities and the content that the user would like to do with his/her computing device. For example, the user might be interested in creation of document or playing games. In another aspect, the user might be more interested in the news or entertainment websites in the web. The utility computing service of the present invention has a user interface through which the user can receive a number of application icon, Internet based information and content on the desktop itself. For example, the user can include widgets from his/her favorite sporting websites. Also, the user could track his/her mails or chats through widgets on the desktop. The utility computing environment acts as middleware to provide applications and content from different application and content providers hosted on the Internet and on the utility computing servers. These could be available for free or for a cost, which could be one time or periodical or usage based. The middleware deals with the addition of these content and applications to the environment, its automatic deployment and tracking and billing of the product.

The user during registration could also design the desktop by giving his/her areas of interest. For example, he/she could choose news feed in his mother tongue on the desktop. Through these inputs the user's interests are identified. In addition, the user could also change by removing or adding other customizations and personalization from time to time. These data are updated to his/her utility computing profile. This profile change is referred as periodic profile change.

In another aspect of the present invention, the user interests are also honed by learning from his/her computing service usage pattern. This learning is based on the application, website and content used by the user. Thus the user's interests can be sub-categorized and newer interests can be discovered. These are the dynamic interests of the user's utility computing service profile. Based on these interests, suggestions on content, applications and websites can be made to the user and based on his/her confirmation the dynamic interest would become a more permanent periodic interest in the profile.

The profile, thus created, can be used in many places. A few of these are as follows:

Advertisement Engine: Information provider and advertisers can send out targeted messages to the potential customers. They can register for sending out information to a set of users based on their characteristics and interests.

The information can be provided to specific customers or when the maximum number of users comes online, the information could be sent out to the users. In case there are multiple information providers and advertisers looking forward for the same set of users then bidding process is put in place. The bidding could be based on the payment to utility computing service provider per click or view by the user.

Application and content providing: The applications and content providing is targeted for users with particular interests and characteristics. For example, a local language news paper widget would only be available, to users who understand that language. This widget would not be shown by default for purchase of all the users in the utility computing service. A match would be done between the applications or content's targeted interest and characteristics with the users and only if there are a sizable match would the application be shown to the user. The user would be shown these applications and content through a portal that has a shopping cart. The portal would also take care of the customization, personalization and other controls of the user environment.

Further the present invention deals with how the information is gathered and utilized once the profile is created. The usage data of the users is collected and managed by the utility computing service management system (UCSMS). The UCSMS comprises a CRM module that collects the basic customer details and these details are passed on to the Profile Engine (PE) to form the characteristics of the users. The data that is collected is sent in batches to the Profile Engine (PE), which analyses the data and summarizes it to form the characteristics and dynamic interests of the user. Besides these, the transactions done by the users are also stored to get an idea of the web purchasing pattern of the user. The collected information is stored by the PE in an associated database. The database stores both the current interests and characteristics of the user (like an average) and the pattern of usage over the past years. This would give an idea as to the spending pattern of the user. For example, information like which months of the year does the user spend come out of the above mentioned details are stored. This information is used in categorizing users. For example, one category would be a set of user who reside in a particular area and spend on cloths in the month of October. Many advertisers seek this information and find out the peak time the users are online to send out information about the deals available.

The system provides information through multiple categorization schemes. Some are based on tree structure, wherein the categorization and sub-categorization is based on interests. For example, the tree would categorize users interested in music and then sub-categorize these users based on the information gathered into people who are interested in Rock, World Music, Classical, etc. This tree would be created for all types of interests. The categorization of people based on the combination of interests and characteristics uses the categories from this tree to build the set of users who fit into the combination. For example, to find a set of users residing in a particular area who are interested in a particular brand of cloths sold online, the search mechanism would find the set of users who shop for cloths online. The brand could be associated with a set of people in a particular salary range. The set of users in that particular salary range are then determined. The advertiser should also provide details on the accuracy value of the set of users. For example, the salary range accuracy could be around 30 to 40% for all users as there is very little verification that is possible for this. So if the accuracy value is high then only a small set of users would be provided.

The algorithm for this example works as follows:
Find the set of users who shop online for cloths;
Find the set of users in the salary range mentioned;
Find the union of the two sets;
Find all users in the resultant set who are in an accuracy range equal to or above what is required by the advertiser; and
Provide this set of users to the advertisement mechanism For the bidding based mechanism, the users who match the required combination of interests and characteristics are stored in a database. The database is updated during the non-peak hours to update the changes that happen in the user's characteristics and interests and also to bring in new users and delete users who have unsubscribed to the utility computing service. At periodic intervals, the PE determines the number of users from this set who are online. It publishes this set to the interested advertisers and starts the bidding process. The advertising rights are handed to the highest bidder.

Another use case is that the experience of a user can be extended to a community of users with similar interests. For example, if the PE detects some specific vector of interest for user 'A'—because he/she was found using Ap1, Ap2 applications and content. But for this specific vector of interests, PE has collected experience of the users 'B' (Ap1, Ap3), 'C' (Ap3, Ap5), 'D' (Ap1, Ap4). So, the system can suggest for user 'A' some more experience—applications Ap3, Ap4, Ap5.

The profile parameters, viz., interests and characteristic can be added dynamically at a later point of time.

Another aspect of the present invention is the use of profile in providing applications, content and services, referred from here as product services, to the most relevant customers. Providing applications, content and services by using the profile comprises a mechanism to automatically register product services to the utility computing system and to display the appropriate product services in the users online shopping area in his/her customer service portal. The overall process of adding the product services is as follows:

Application/Content provider gives information on the product service that the provider is interested in providing;

The information provided includes:
Name of the product service and type (client/server/Internet)
Product Service installable (if required)
Icons and other details
Costing
Characteristics of the product service: Language, category like sports, movies, etc., geography, etc.

The product service then goes through a work flow where it is approved by the different teams of the utility computing service provider (e.g.) technology, marketing, finance, etc;

The cost of the product service is assigned and it is ready for deployment;

The product service is put in deployment database and the offering database;

The product service is available to the users;

When a user logs into the utility computing service customer portal, his/her interests and characteristics are matched with the characteristics tags of the product and only the matches are displayed in the customer's portal; and The details in the deployment database are used in the deployment of the application.

The purchase is tracked so that the revenues can be split between the product developer and the service provider.

According to another aspect of the present invention is to optimize last mile bandwidth utilization and internet cost to users while downloading data/content from the web. Normally, utility computing users are provided with a storage space in the server farm (referred to as remote home directory), as one of the services provided over the cloud. This remote home directory is accessible at the end device as a local directory through mounting. Whenever users download content from the web (e.g. songs, movies, tutorials, files etc.), they are provided with a choice for storing the downloaded data. They can either store it in their local storage device (e.g. USB) or they can store it in their remote home directory. If they choose remote home directory, then the content is downloaded directly to the server farm's storage space. Normally, when contents are downloaded from the web via the device's browser, content first comes to the device from the actual web server. Based on the user's choice, the downloaded content is then copied to either the local storage (USB) or to the remote home directory. In the latter case, the downloaded content has to first come from the web server to the device and then it has to be uploaded to the storage space in the server farm. The content has to travel via the last mile twice, one in each direction (downstream/upstream), as the device's connectivity to any network is through the last mile.

Thus the present invention provides a facility by which the web content gets directly downloaded from the web server to the server farm, without going to the end device. If the user chooses remote home directory as the destination for downloading content, then a background program in the device takes control of the download. It stops the usual web request that goes from the device's browser to the web server. Instead it communicates few relevant parameters of this downloaded request like source URL (Uniform resource locator) and the actual destination directory (user's home directory) to a peer program running in the storage server through a reliable control connection (e.g. TCP). The peer program in the storage server then initiates a request to the actual web server to download the content. Since the web request goes directly from the storage server, the web server sends the content back directly to the storage server. The downloaded content is then stored in the user's home directory present in the storage server. This results in reducing the interne usage cost of the end user as well as improving the overall utilization of the network. Such a service could either be provided to those users whose profile indicates that they are frequent down loaders or it could be provided as a service to all the users.

FIG. 1 illustrates a utility computing management system 100 according to the present invention, in an embodiment. A profile engine (PE) 104 generates a profile information of a client side device 106, which is transmitted between the client side device 106 and a web server 102. User data is collected and sent by the customer relationship management module (CRM module) 108 in batches to the PE 104, wherein the PE analyses and summarizes the data and forms dynamic interests and characteristics of the user which are stored in an associated database 110. The web contents are stored from the web server 102 to a server farm 112. A web request from the client side device's browser 118 to the web server 102 is stopped using a background program 120 in the client side device 106. The relevant parameters of the downloaded request are communicated to a peer program 116 running in a storage server 114. A request is initiated to the web server 102 to download the content, wherein the content is sent back directly to the storage server 114 in the server farm 112 by the web server 102, and the downloaded content is stored in the user's home directory present in the storage server 114 in the server farm.

The details of the invention, its object and advantages are explained here above is to be understood that the invention, as fully described herein is not intended to be limited by the objects mentioned herein. The described embodiments are to be considered in all respects only as illustrative and not restrictive.

We claim:

1. A utility computing management system (UCMS) for managing a profile and interest of a user in a cloud based managed utility computing environment, the utility computing management system comprising:
   one or more servers;
   a profile engine (PE) to generate a profile information of a client side device, wherein the profile information comprises at least one of a device profile and a user profile, and wherein the user profile and the device profile are driven by a dynamic information capture and a periodic information capture, and wherein the profile information is transmitted between the client side device and a web server; and
   a customer relationship management module (CRM module),
   wherein the cloud based managed utility computing environment acts as a middleware to provide applications and web content to the user, wherein the usage data of the user is collected, managed and sent by the UCMS and a user data is collected and sent by the CRM modules respectively in batches to the PE, wherein the PE analyses and summarizes the data received from the UCMS and the CRM modules and to form dynamic interests and characteristics of the user respectively which are stored in an associated database, wherein the user can receive applications, information, and contents through the user interface on the user's desktop, wherein the client side device is completely managed through the Internet, wherein a self-healing is achieved by determining a condition of applications and data at the client side device and synchronizing with a web server across the Internet to rectify an issue;
   wherein the web contents are stored from the web server to a server farm, without going to an end device, thereby optimizing last mile bandwidth utilization and interest cost and wherein a web request from the client side device's browser to the web server is stopped using a background program in the client side device; wherein the relevant parameters of the downloaded request like a source Uniform resource locator and an actual destination directory are communicated to a peer program running in a storage server through a reliable control connection; wherein a request is initiated to the web server to download the content, wherein the content is sent back directly to the storage server in the server farm by the web server, and wherein the downloaded content is stored in the user's home directory present in the storage server in the server farm.

2. The system as claimed in claim 1, wherein the dynamic information capture is the information that emerges out of users' usage of the client side device and based on said information, the user is provided with related applications and contents.

3. The system as claimed in claim 1, wherein the periodic information capture is based on the users confirmation of interests in a new area and application.

4. The system as claimed in claim 1, wherein the user can from time to time change the profile.

5. The system as claimed in claim 1, wherein the associated database stores the current user interest, characteristics of the user, and the pattern of usage based on time.

6. The system as claimed in claim 1, wherein data relating to new applications and for contents are added as a service to the UCMS through an automated work flow process comprising:
- loading the service through a web based interface that connects to the UCMS;
- storing the data in a service database;
- sending a trigger on the availability of the service for testing;
- testing the service and either approving or rejecting the service;
- sending an approved service for further finance, marketing and sales approval;
- assigning a cost to the approved service; and
- positioning the service in the deployment and offering database and making available the data relating to new applications and contents to users for purchase;
- wherein making available the data relating to new applications and for contents is based on the characteristics and interest of the user in the profile; and
- wherein the purchase is tracked to split the revenues between a developer of the new applications and/or contents and a provider of the service.

7. A utility computing management system (UCMS) for managing a profile and interest of users in a cloud based managed utility computing environment, the utility computing management system comprising:
- one or more servers;
- a profile engine (PE) to generate a profile information of a client side device, wherein the profile information comprises at least one of a device profile and a user profile, wherein the profile information is transmitted between the client side device and a web server; and
- a customer relationship management module (CRM module),
- wherein the cloud based managed utility computing environment acts as a middleware to provide applications and web content to a user, wherein the usage data of the user is collected, managed and sent by the UCMS and a user data is collected and sent by the CRM modules respectively in batches to the PE, wherein the PE analyses and summarizes the data received from the UCMS and the CRM modules and to form dynamic interests and characteristics of the user respectively which are stored in an associated database;
- wherein the web contents are stored from the web server to a server farm, without going to an end device, thereby optimizing last mile bandwidth utilization and interest cost and wherein a web request from the client side device's browser to the web server is stopped using a background program in the client side device; wherein the relevant parameters of the downloaded request like a source URL (Uniform resource locator) and an actual destination directory (user's home directory) are communicated to a peer program running in a storage server through a reliable control connection; wherein a request is initiated to the web server to download the content, wherein the content is sent back directly to the storage server in the server farm by the web server, and wherein the downloaded content is stored in the user's home directory present in the storage server in the server farm.

8. The system as claimed in claim 7, wherein dynamic information capture is the information that emerges out of users' usage of the client side device and based on said information, the user is provided with related applications and contents.

9. The system as claimed in claim 7, wherein the periodic information capture is based on the users confirmation of interests in a new area and application.

10. The system as claimed in claim 7, wherein the user can from time to time change the profile.

11. The system as claimed in claim 10, wherein the associated database stores the current user interest, characteristics of the user, and the pattern of usage based on time.

12. The system as claimed in claim 1, wherein data relating to new applications and for contents are added as a service to the UCMS through an automated work flow process comprising:
- loading the service through a web based interface that connects to the UCMS;
- storing the data in a service database;
- sending a trigger on the availability of the service for testing;
- testing the service and either approving or rejecting the service;
- sending an approved service for further finance, marketing and sales approval;
- assigning a cost to the approved service; and
- positioning the service in the deployment and offering database and making available the data relating to new applications and contents to users for purchase;
- wherein making available the data relating to new applications and for contents is based on the characteristics and interest of the user in the profile; and
- wherein the purchase is tracked to split the revenues between a developer of the new applications and/or contents and a provider of the service.

* * * * *